United States Patent

[11] 3,571,506

[72] Inventor John David Millward
Orpington, England
[21] Appl. No. 695,091
[22] Filed Jan. 2, 1968
[45] Patented Mar. 16, 1971
[73] Assignee The Rank Organisation Limited
London, England
[32] Priority Feb. 7, 1967
[33] Great Britain
[31] 5712/67

[54] PULSE SHAPING MEANS FOR BLANKING PULSES
2 Claims, 2 Drawing Figs.

[52] U.S. Cl. 178/7.1, 307/263, 307/268
[51] Int. Cl. H04n 5/38
[50] Field of Search 178/69.5 (G), 7.1, 7.1 (D.C.), 6 (VAR)(B—W)(Digest); 307/263, 268, 228; 328/114, 142, 185

[56] References Cited

UNITED STATES PATENTS

| | | | |
|---|---|---|---|
| 2,717,931 | 9/1955 | Duke | 178/6VBW |
| 2,872,509 | 2/1959 | Donnay | 178/7.1D.C. |
| 3,125,694 | 3/1964 | Palthe | 307/228 |
| 3,288,930 | 11/1966 | Johnson | 178/6VBW |

*Primary Examiner*—Robert L. Richardson
*Attorney*—Griffin and Branigan

ABSTRACT: A television video signal blanking pulse generator produces relatively clean blanking pulses by being arranged to increase the rise and fall rates of each blanking pulse amplitude as said amplitude passes a predetermined limit, suitably the maximum video signal amplitude.

PULSE SHAPING MEANS FOR BLANKING PULSES

Figure 1:
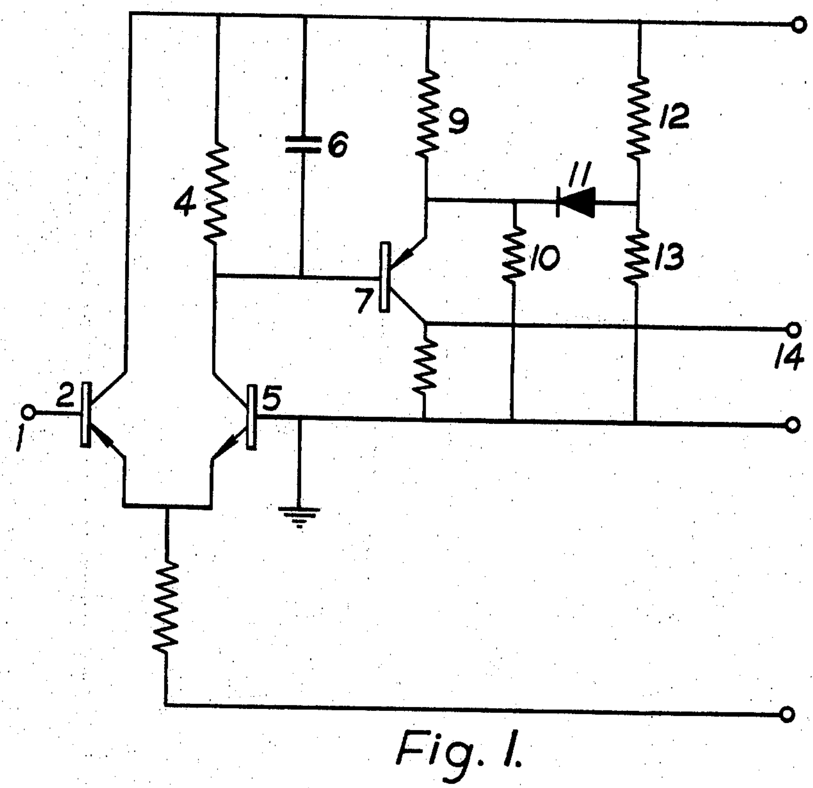

This invention relates to pulse generators and is particularly concerned with such generators effective to produce a train of recurrent blanking pulses for injection into a television video signal.

In, for example, a television receiving or a television transmitting apparatus, the video signal includes a train of recurrent pulses which are related in time to the scanning process of the cathode ray display tube of the apparatus. These pulses referred to as blanking pulses which, in transmitting apparatus originate in a central sync generator at line and frame frequency, are combined with the video signal to produce a composite signal and are utilized in the receiving apparatus to suppress the video signal and/or the scanning signal during the line or frame fly-back periods.

It is an essential requirement in such television transmitting or receiving apparatus, that the blanking pulses in the video signal are both electrically clean and free of interference as well as having a base width, together with an overall rise and fall time which are accurately maintained within specified limits.

In order to produce a suitably clean and interference free blanking pulse which is suitable for use in subsequent clamping circuits effective to maintain the DC level of the video signal at a specified level, the peak amplitude of the blanking pulses must be arranged to exceed the maximum amplitude excursions in the video signal per se.

In conventional blanking pulse generators, the amplitude rise and fall rates of the blanking pulses generated remain substantially constant over the whole range of pulse amplitude, so that the overall rise and fall times of the pulses and therefore the base width will increase as the pulse amplitude increases.

In a television flying spot scanner effective to generate a video signal representative of information stored on a positive optical film, the width together with the rise and fall times of the blanking pulses can be maintained within the specified limits with relative ease, since the contrast range of this film does not demand an excessive blanking pulse amplitude. In the case of negative film, however, the relatively larger contrast range demands a relatively higher blanking pulse amplitude, so that with a constant pulse rise and fall rate determined by the pulse generator, it becomes increasingly difficult to maintain the overall pulse width together with the overall arise and fall times of the pulse within the limits specified.

According to one aspect of the present invention, a generator effective to produce a train of recurrent blanking pulses for injection into a television video signal, is arranged to produce an increase in the rate of rise and in the rate of fall of the pulse amplitude, when this amplitude exceeds a selected limit.

Suitably the limit at which the rate of rise and rate of fall of the blanking signal amplitude increases, is the level of the maximum excursion of the video signal into which the pulses are injected.

According to a further aspect of the present invention, a circuit arrangement for injecting a train of recurrent blanking pulses into a television video signal, comprises a video signal source, a generator effective to inject a train of recurrent blanking pulses into the video signal and arranged to produce an increase in the rate of rise and in the rate of fall of the pulse amplitude when this amplitude exceeds a selected amplitude when this amplitude exceeds a selected amplitude level of the video signal. By use of the invention the overall width together with the overall rise and fall time of the pulse can be maintained within specified limits without affecting the characteristics of the portion of the blanking pulse which lies within the maximum video amplitude excursion range.

Normally the rate of rise and the rate of fall of blanking pulse amplitude is substantially linear with time particularly within the video signal amplitude excursion range.

Preferably the decay or fall characteristics of the blanking pulse are made symmetrical with the rise characteristics.

Figure 2:
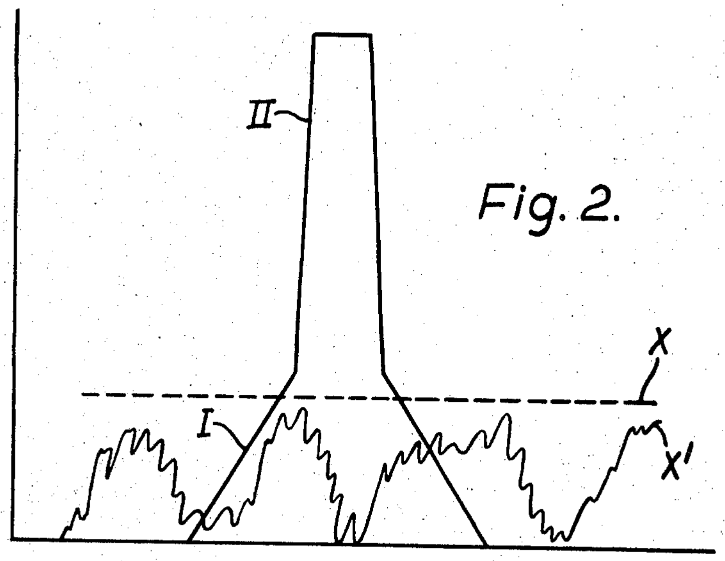

An embodiment of the invention will now be particularly described by way of example with reference to the accompanying drawings in which FIG. 1 is a circuit diagram of a pulse generator effective to produce a train of blanking pulses in accordance with the present invention and FIG. 2 is a graphical representation of the pulse shape produced by the generator of FIG. 1.

Referring to FIG. 1 of the drawings, a standard negative going mixed blanking signal in which the rate of rise and the rate of fall of pulse amplitude are substantially linear with time is applied to an input terminal 1 of the circuit arrangement. This blanking signal is directly applied to the base of transistor 2 which forms one half of an emitter coupled transistor pair consisting of transistors 2 and 5 which drives a fixed pulse of current into the collector load of transistor 5 consisting of resistor 4 in parallel with capacitor 6. While the waveform at the collector of transistor 5 is exponential due to the RC collector load circuit 4, 6 the arrangement is such that only the substantially linear parts of this exponential waveform are used to drive transistor 7, this result is obtained by ensuring that transistor 7 is cutoff for the first part of the waveform due to bias from resistors 9 and 10 and also by ensuring that transistor 7 bottoms for the top part of the exponential waveform does not appear at the output terminal 14. Transistor 7 thus commences conduction only on a linear part of the curve and as the current rises, the first substantially linear part I of the output waveform, as shown in FIG. 2, is produced.

Thereafter a point is reached where diode 11 becomes conducting as selectively determined by adjustable or preselected bias resistors 12 and 13 and once this has occurred the emitter load of transistor 7 becomes very much lower as the parallel combination of resistors 9 and 12 is chosen to be much lower than the resistor 9 alone.

From this point onwards the current pulse and amplitude accordingly increases relatively more rapidly until transistor 7 bottoms to produce the second substantially linear part II of the output waveform. The second part of the pulse is symmetrical and a mirror image of Parts I and II, the intersection of Parts I and II being above maximum excursion limits X of the video signal X' into which the blanking pulses are injected.

I claim:

1. A pulse shaping means for blanking pulses for injection into a television video signal including a transistor, an output load circuit connected to said transistor, a biasing circuit biasing the transistor to nonconduction, an input drive circuit including a resistance-capacitance combination, said drive circuit being responsive to a television blanking signal so that conduction of the transistor takes place over substantially linear parts of the amplitude changes in said input drive circuit, and a load circuit changing device which is operative to change the effective transistor load when the amplitude of the transistor output pulse exceeds a predetermined level, whereby during impression of the linear parts of the amplitude changes on the control terminal of the transistor, the amplitude of the resulting output pulse varies linearly at a lower rate below said level than above it.

2. A pulse shaping means according to claim 1, wherein said load circuit changing device is a diode included in the load circuit.